Patented June 12, 1928.

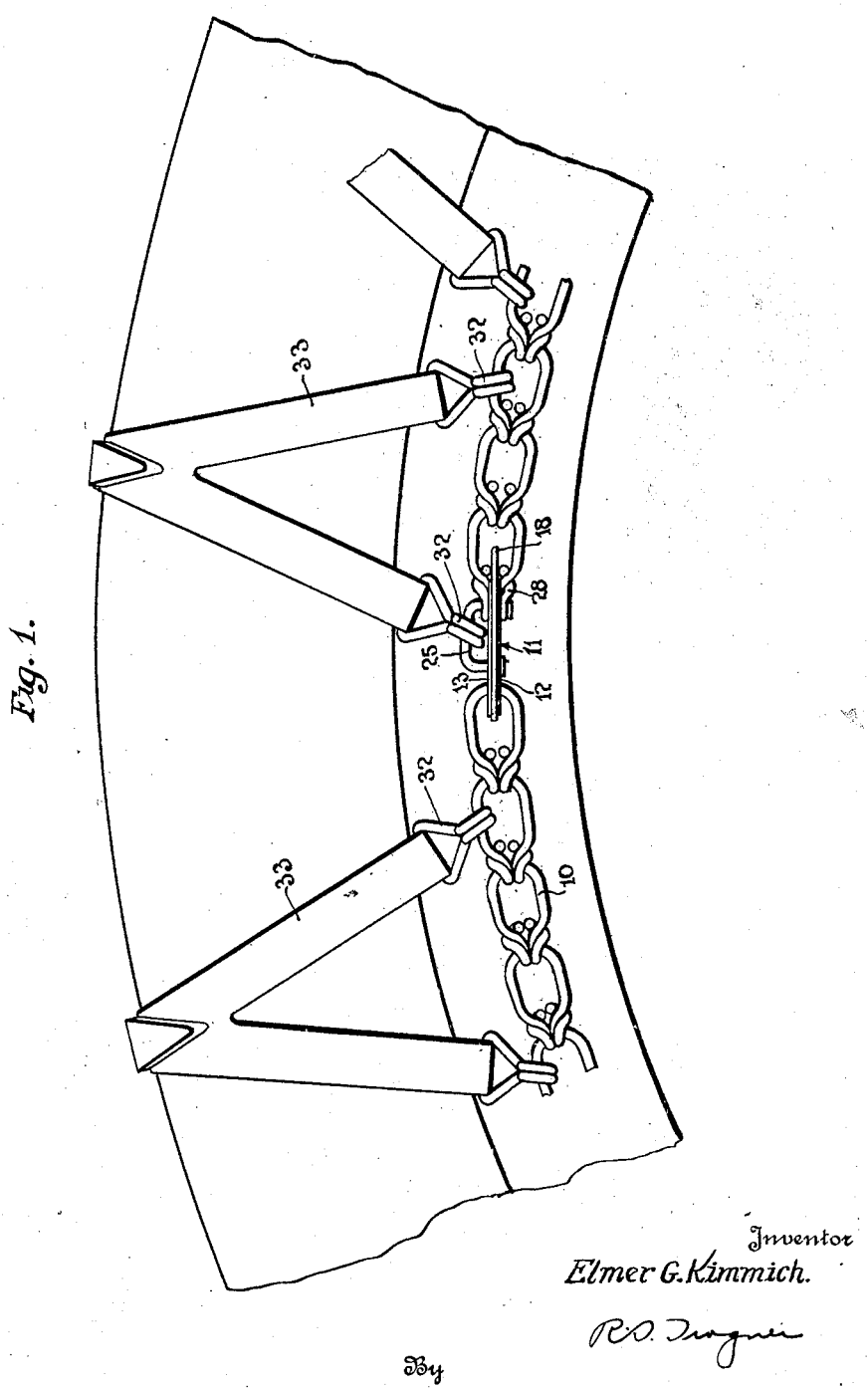

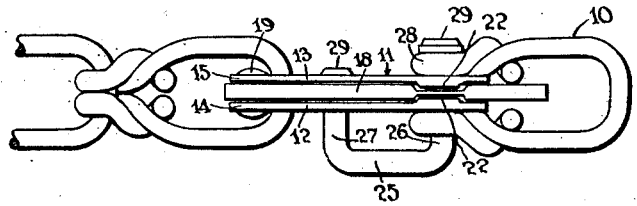
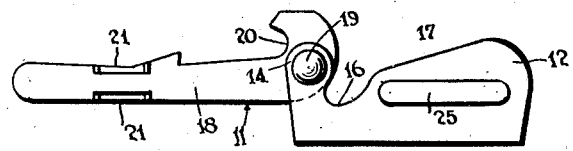
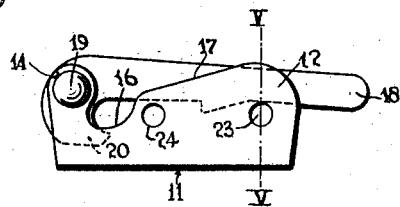
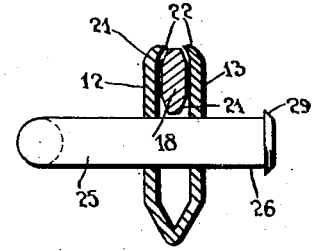
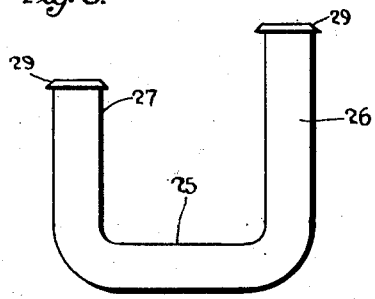

1,673,515

UNITED STATES PATENT OFFICE.

ELMER G. KIMMICH, OF AKRON, OHIO, ASSIGNOR TO THE GOODYEAR TIRE & RUBBER COMPANY, OF AKRON, OHIO, A CORPORATION OF OHIO.

CHAIN-FASTENING DEVICE.

Application filed September 2, 1927. Serial No. 217,113.

My invention relates to antiskid chains, such as those employed in conjunction with tires of motor vehicle wheels, and it has particular reference to means for connecting the ends of such chains when they are applied to the tires.

Tire chains of the character referred to comprise a pair of chains which are adapted to be disposed on each side of a vehicle tire, and a plurality of tractive elements which overlie the tread portion of the tire, such elements being connected to the side chains at suitable intervals. One end of each side chain is provided with a locking device which engages any one of the links adjacent the opposite end of the chain to secure it in operative position on the tire. The chains are made sufficiently long to allow for variation in the size of the tires upon which they are to be used and, therefore, several spare links are provided at the end of each chain. When the chains are applied to the tire a suitable link is chosen to insure a snug fit and the fastening device is secured through such link. The space occupied by the fastener and the spare links causes the distance between the two end tractive elements to be greater than that between the other tractive elements. Accordingly the tractive elements are not evenly distributed and the tire is not properly balanced circumferentially thereof. One of the primary objects of the present invention is to obviate the uneven spacing of the end tractive elements by the provision of a novel fastening device which is designed to be connected directly to one of the tractive elements.

An additional object resides in the provision of a novel locking means whereby accidental opening of the fastener is prevented.

The invention is fully described in the following specification and is illustrated in the accompanying drawings which form a part thereof, wherein;

Fig. 1 is a fragmentary side-elevational view of a tire and a chain embodying my invention applied thereto.

Fig. 2 is a fragmentary side-elevational view of a chain equipped with a fastener embodying my invention and illustrated in closed position;

Fig. 3 is a plan view of the fastener in open position;

Fig. 4 is a plan view of the fastener in closed position;

Fig. 5 is a cross-sectional view, on a larger scale, illustrating an improved locking means for the fastener, the view being taken substantially along the line V—V of Fig. 4; and Fig. 6 is a side-elevational view, on a larger scale, illustrating in detail a chain receiving staple.

In practising my invention I provide a chain 10 of suitable construction for use as one of the side chains of an antiskid device. The opposite ends of the chain 10 are adapted to be connected to each other by means of a fastener 11 which is carried by one of the end links of the chain 10. The fastener 11 comprises a body portion formed of a single piece of sheet material folded into substantially U-shape to provide spaced parallel side walls 12 and 13. The side walls 12 and 13 are identical and each is cut away adjacent one end to form upstanding ears 14 and 15 and depressions or seats 16. The walls are inclined from a point adjacent the seats 16 to provide tapered surfaces 17. A locking lever or tongue 18 is pivotally connected adjacent one end between the ears 14 and 15 by means of a rivet 19, disposed in aligned apertures in the ears and the lever. The lever is formed with a hooked end 20, and is provided with beveled edge portions 21 adjacent its free end. When the lever is in closed position, as shown by Figs. 2 and 4, it is held against accidental displacement by means of inwardly turned portions 22 formed on the upper edges of the walls 12 and 13, which are sprung apart by pressing the lever 18 therebetween. The beveled edge portions 21 facilitate the entry or withdrawal of the lever from between the portions 22 on the walls of the fastener.

The walls 12 and 13 are provided with spaced aligned apertures 23 and 24 that are adapted to receive a staple 25 having relatively long and short legs 26 and 27, respectively. The longer leg 26 is disposed in the aperture 23 and extends beyond the wall 13 forming attaching means for one of the end links 28 of the chain 10, the free end of which is looped therearound at points adjacent the outer sides of the fastener walls. The ends of the staple are spread or peened, as indicated at 29, against the chain link 28 and the fastener wall, respectively.

The loop formed by the staple is adapted to receive one end portion 32 of a cross chain or tractive element 33. This end portion 32 is in the form of an open link or hook that is threaded through the loop of the staple and then is closed to form a coacting loop.

By providing the fastener with means adapted to receive one of the traction elements, it is possible to secure more even spacing of the elements around the chain, resulting in a better balanced and neater appearing wheel, as well as increasing the tractive quality.

Although I have illustrated but one form which the invention may assume and have described that form in detail, it will be apparent to those skilled in the art that the invention is not so limited, but that various minor modifications may be made therein without departing from the spirit of the invention or from the scope of the appended claims.

What I claim is:

1. A tire chain fastener comprising spaced substantially parallel walls, a tongue pivotally connected between the walls and adapted to lie therebetween when in closed position, and means constituting portions of the walls for yieldingly opposing displacement of the tongue from closed position, the tongue being formed with means to facilitate its movement to closed position.

2. A tire chain fastener comprising spaced parallel walls provided at their upper edges with inturned portions, a tongue pivotally connected between the walls adjacent one edge of the fastener, said walls having beveled edge portions in alignment with the inturned portions adapted to force the walls apart as the tongue is moved to closed position between the walls.

3. A tire chain fastener comprising a sheet folded to provide spaced parallel walls formed with reduced portions adjacent one edge of the fastener, a tongue pivotally secured between the walls and adapted to lie therebetween when in closed position, a hooked end constituting a part of the tongue and coacting with the reduced portions of the walls to form link receiving means, and means formed on the walls, for yieldingly opposing displacement of the tongue when in closed position.

4. A tire chain fastener comprising spaced parallel walls having their upper edges inclined and provided with depressed portions, a tongue pivotally secured between the walls and adapted to lie therebetween when in closed position and means formed on the walls for coaction with the tongue to oppose displacement of the tongue from closed position between the walls.

In witness whereof, I have hereunto signed my name.

Signed at Akron, in the county of Summit, and State of Ohio, this 1st day of September, 1927.

ELMER G. KIMMICH.

DISCLAIMER.

1,673,515.—*Elmer G. Kimmich*, Akron, Ohio. CHAIN-FASTENING DEVICE. Patent dated June 12, 1928. Disclaimer filed July 28, 1928, by the patentee, assignee, *The Goodyear Tire & Rubber Company*, concurring.

Hereby enters this disclaimer to all of the claims in said application which are in the following words, to wit:

"1. A tire chain fastener comprising spaced substantially parallel walls, a tongue pivotally connected between the walls and adapted to lie therebetween when in closed position, and means constituting portions of the walls for yieldingly opposing displacement of the tongue from closed position, the tongue being formed with means to facilitate its movement to closed position.

"2. A tire chain fastener comprising spaced parallel walls provided at their upper edges with inturned portions, a tongue pivotally connected between the walls adjacent one edge of the fastener, said walls having beveled edge portions in alignment with the inturned portions adapted to force the walls apart as the tongue is moved to closed position between the walls.

"3. A tire chain fastener comprising a sheet folded to provide spaced parallel walls formed with reduced portions adjacent one edge of the fastener, a tongue pivotally secured between the walls and adapted to lie therebetween when in closed position, a hooked end constituting a part of the tongue and coacting with the reduced portions of the walls to form link receiving means, and means formed on the walls, for yieldingly opposing displacement of the tongue when in closed position.

"4. A tire chain fastener comprising spaced parallel walls having their upper edges inclined and provided with depressed portions, a tongue pivotally secured between the walls and adapted to lie therebetween when in closed position and means formed on the walls for coaction with the tongue to oppose displacement of the tongue from closed position between the walls."

[*Official Gazette August 14, 1928.*]